UNITED STATES PATENT OFFICE.

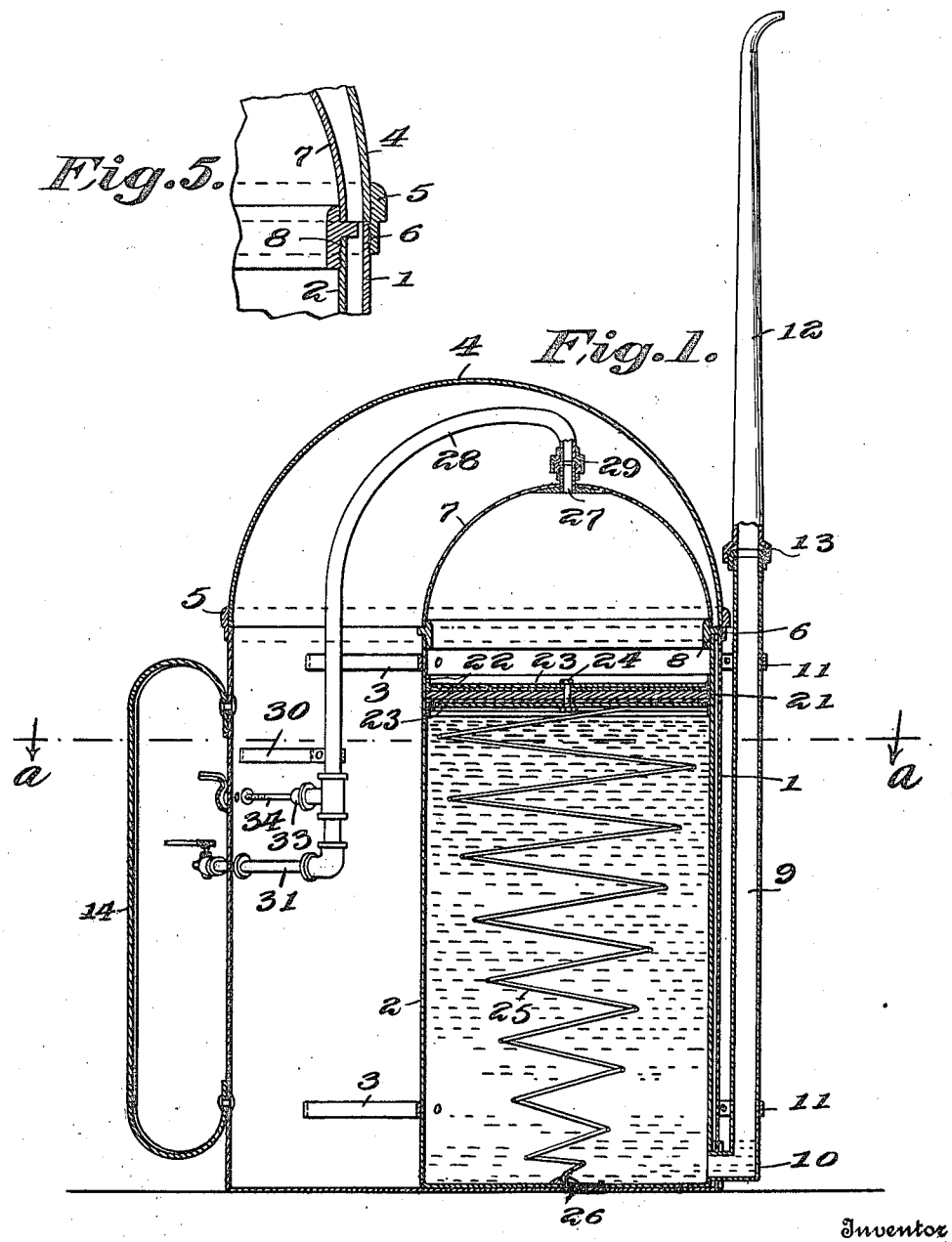

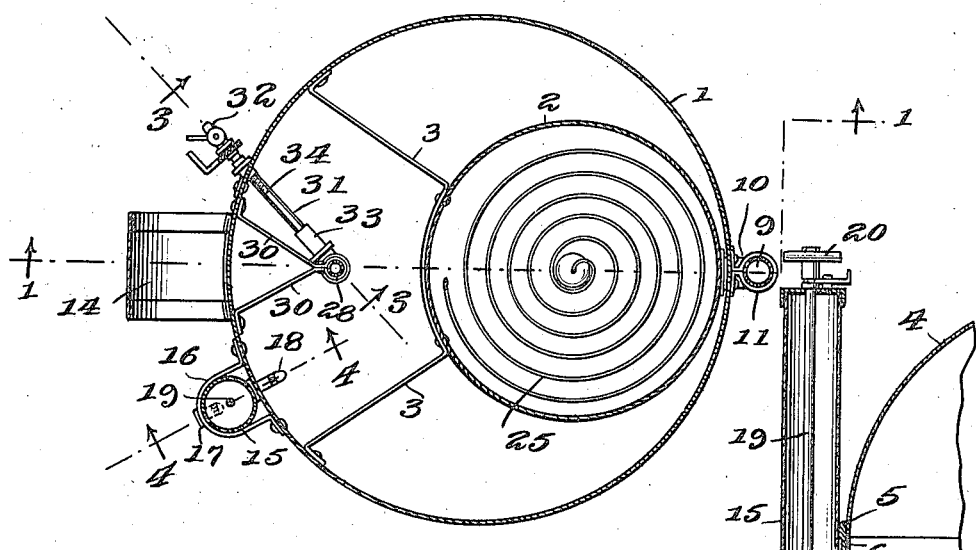
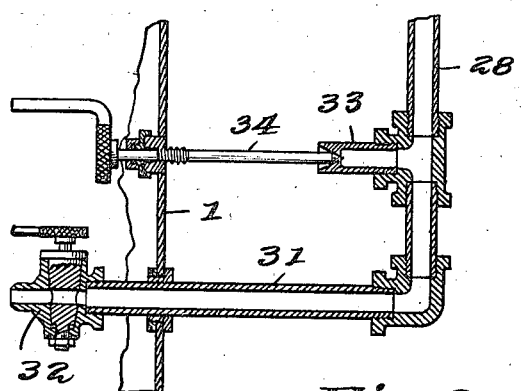
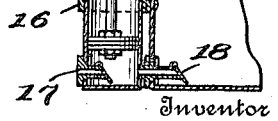

JOSEPH A. BLANCHETTE, OF STE. ANNE DES CHIMES, MANITOBA, CANADA.

OIL-CAN.

1,230,061.  Specification of Letters Patent.  Patented June 12, 1917.

Application filed February 25, 1916. Serial No. 80,506.

*To all whom it may concern:*

Be it known that I, JOSEPH A. BLANCHETTE, a subject of the King of Great Britain, residing at Ste. Anne des Chimes, in the Province of Manitoba, and Dominion of Canada, have invented new and useful Improvements in Oil-Cans, of which the following is a specification.

This invention is an improved oil can for applying lubricating oil to machine parts and for other similar uses, the object of the invention being to provide an improved oil can of this character embodying air pressure operated means for forcing out the oil and manually operable controlling means for the air pressure mechanism.

The invention consists in the features of construction, combination, and arrangement of devices, hereinafter described and claimed.

In the accompanying drawings:—

Figure 1 is a vertical sectional view of an oil can constructed and arranged in accordance with my invention.

Fig. 2 is a transverse sectional view of the same on the plane indicated by the line *a—a* of Fig. 1.

Figs. 3, 4 and 5 are detail vertical sectional views.

In the embodiment of my invention, I provide an outer vessel 1 and an inner vessel 2. These vessels are preferably and are here shown as cylindrical, and the vessel 2 is of much less diameter than the vessel 1 and is arranged in one side thereof as shown. Braces 3 connect the vessels 1, 2. The vessel 1 has a cover 4 which is here shown as semi-spherical and which is provided with a band or ring 5 and is screwed to the vessel 1 as at 6. The vessel 2 has a similar cover 7 screwed thereto as at 8. An oil delivery pipe 9 leads from the vessel 2 and is connected thereto by an elbow 10 and is secured on the outer side of the vessel 1 by straps 11. Said oil delivery pipe is provided with a tapered discharge nozzle 12 which is screwed thereto as at 13 so that it may be uncoupled therefrom when desired. Said vessel 1 is provided, on the side opposite the pipe 9 with a handle 14.

The barrel or cylinder 15 of an air compressing pump is secured in one side of the vessel 1 as by means of suitable straps 16 and is provided at the lower end with a valved air intake 17 and also with a valved air outlet 18 which discharges compressed air into the vessel 1 so that said vessel forms a compressed air reservoir which is supplied by the pump. The plunger rod of the pump is indicated at 19 and the handle at 20. Within the scope of my invention, the compressed air pump may be of any suitable construction.

A piston 21 is arranged in the inner vessel 2 and is here shown as provided on opposite sides with packing rings 22 secured in place by disks 23 and a central screw 24. A coiled extensile spring 25 is arranged in the vessel 2 with one end bearing against the under side of the piston and the other end arranged in a step bearing as at 26. This spring normally forces the piston upwardly. That portion of the vessel 2 below the piston constitutes a reservoir for the reception of the lubricating oil. The cover 7 of the vessel 2 is provided with a nipple 27 to which one end of a pipe 28 is connected by a suitable coupling 29. This pipe 29 is arranged in the compressed air reservoir 1 as shown, is secured by suitable braces 30 and is provided with an air outlet arm 31 which extends through one side of said reservoir 1 and is provided with a controlling valve 32. Said pipe 28 also has an air inlet arm 33 which is arranged in the reservoir 1 and which coacts with a needle valve 34 to permit compressed air to be admitted to the reservoir 2, above the piston, when the needle valve is opened and hence cause the compressed air to force the piston downwardly, thereby subjecting the oil in the reservoir 2 to pressure and hence causing oil to be ejected from the reservoir 2 and forced through the pipe 10 and its nozzle 12 and applied to a bearing or any other machine part which it is desired to lubricate.

When the valve 34 is closed, the valve 32 may be opened, thus permitting the escape of compressed air from the reservoir 2 above the piston and hence relieving pressure on the oil in the reservoir and enabling the spring 25 to move the piston upwardly. The reservoir 1 may be supplied with compressed air from time to time by operating the air pump. The device may be manipulated by one hand, the handle 14, the valve 32, and the handle of the needle valve 34 being all on the same side of the reservoir 1.

Having described the invention, what is claimed is:

In an oiler of the class described, a compressed air reservoir, means to supply the same with compressed air, an oil reservoir, a piston in the oil reservoir, a discharge nozzle leading from the lower end of the oil reservoir, a spring to raise the piston, a pipe connected to the upper end of the oil reservoir and having a valved air inlet arranged in the compressed air reservoir to admit compressed air to the upper portion of the oil reservoir from the air reservoir, and a valved air outlet for the said pipe to discharge compressed air from the oil reservoir into the outer air, the valves for said air inlet and air outlet having operating means arranged at one side of the air reservoir, and a handle for the said reservoir on the same side thereof, the said oil reservoir being arranged in the said compressed air reservoir.

In testimony whereof I affix my signature in presence of two witnesses.

JOSEPH A. BLANCHETTE.

Witnesses:
F. E. BARBER,
K. J. LUFFKA.